United States Patent
Sawyers-Abbott et al.

(10) Patent No.: US 11,512,608 B2
(45) Date of Patent: Nov. 29, 2022

(54) PASSIVE TRANSPIRATIONAL FLOW ACOUSTICALLY LINED GUIDE VANE

(71) Applicant: Raytheon Technologies Corporation, Farmington, CT (US)

(72) Inventors: Nigel David Sawyers-Abbott, South Glastonbury, CT (US); Anthony R. Bifulco, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 52 days.

(21) Appl. No.: 17/119,510

(22) Filed: Dec. 11, 2020

(65) Prior Publication Data

US 2022/0049621 A1 Feb. 17, 2022

Related U.S. Application Data

(60) Provisional application No. 63/065,923, filed on Aug. 14, 2020.

(51) Int. Cl.
*F02C 7/24* (2006.01)
*F01D 25/04* (2006.01)
(Continued)

(52) U.S. Cl.
CPC ............ *F01D 25/04* (2013.01); *F01D 9/041* (2013.01); *F01D 5/145* (2013.01); *F01D 5/18* (2013.01);
(Continued)

(58) Field of Classification Search
CPC ...... F01D 9/02–065; F01D 5/14; F01D 5/147; F01D 5/145; F01D 5/16; F01D 25/04;
(Continued)

(56) References Cited

U.S. PATENT DOCUMENTS 3,421,577 A * 1/1969 Valyi .................... B21D 53/045
165/170
3,735,593 A * 5/1973 Howell ................. F04D 29/324
415/115
(Continued)

FOREIGN PATENT DOCUMENTS

DE 102010023703 A1 12/2011
EP 1998028 A2 12/2008
(Continued)

OTHER PUBLICATIONS

Extended European Search Report for EP Application No. 21191481.7, dated Feb. 9, 2022, 8 pages.
(Continued)

*Primary Examiner* — Richard A Edgar
*Assistant Examiner* — Behnoush Haghighian
(74) *Attorney, Agent, or Firm* — Kinney & Lange, P.A.

(57) ABSTRACT

A passive transpirational flow acoustic liner assembly for a gas turbine engine includes a guide vane assembly and a conduit configured to deliver airflow received from the guide vane. The guide vane assembly includes an airfoil having a transpirational flow acoustic liner. The acoustic liner includes a face sheet defining a portion of an outer surface of the airfoil and having a plurality of first apertures, a segmented member coupled to the face sheet and having a plurality of chambers in fluid communication with the outer surface via the plurality of first apertures, a backing sheet having a plurality of apertures and being coupled to the segmented member such that the segmented member is positioned between the face sheet and the backing sheet, and a plenum coupled to the backing sheet opposite the segmented member and fluidly connected to the conduit.

20 Claims, 4 Drawing Sheets

(51) Int. Cl.
  *F01D 9/04* (2006.01)
  *F04D 29/32* (2006.01)
  *F01D 5/18* (2006.01)
  *F04D 29/66* (2006.01)
  *F02C 7/045* (2006.01)
  *F01D 5/14* (2006.01)
  *F04D 29/68* (2006.01)

(52) U.S. Cl.
  CPC ............... *F02C 7/045* (2013.01); *F02C 7/24* (2013.01); *F04D 29/324* (2013.01); *F04D 29/667* (2013.01); *F04D 29/682* (2013.01); *F05D 2220/32* (2013.01); *F05D 2240/12* (2013.01); *F05D 2260/96* (2013.01)

(58) Field of Classification Search
  CPC .......... F01D 25/12; F01D 11/20; F01D 11/24; F01D 11/16; F01D 5/182–184; F05D 2260/96; F05D 2260/203; F05D 2260/205; F05D 2220/36; F02C 7/045; F02C 7/24; F04D 29/584; F04D 29/5846; F04D 29/663; F04D 29/664; F04D 29/684; F04D 29/682; F04D 29/665; F04D 29/666; F04D 29/667; F04D 29/668
  See application file for complete search history.

(56) References Cited

U.S. PATENT DOCUMENTS

| | | | | |
|---|---|---|---|---|
| 3,820,628 | A * | 6/1974 | Hanson | F02K 1/827 181/220 |
| 4,255,083 | A | 3/1981 | Andre et al. | |
| 4,749,150 | A | 6/1988 | Rose et al. | |
| 5,782,077 | A * | 7/1998 | Porte | F02C 7/185 60/39.83 |
| 6,004,095 | A * | 12/1999 | Waitz | F04D 29/667 415/115 |
| 6,152,685 | A | 11/2000 | Hagi | |
| 7,018,172 | B2 * | 3/2006 | Prasad | F01D 5/16 416/500 |
| 7,077,623 | B2 * | 7/2006 | Guemmer | F04D 29/324 415/117 |
| 7,334,998 | B2 | 2/2008 | Jones et al. | |
| 7,540,354 | B2 | 6/2009 | Morin et al. | |
| 7,607,287 | B2 * | 10/2009 | Reba | F04D 29/681 416/232 |
| 8,579,225 | B2 | 11/2013 | Mardjono et al. | |
| 9,103,216 | B2 * | 8/2015 | Kennepohl | F01D 5/18 |
| 9,574,452 | B2 * | 2/2017 | Rose | F04D 29/682 |
| 10,066,548 | B2 | 9/2018 | Gilson et al. | |
| 10,107,191 | B2 | 10/2018 | Gilson et al. | |
| 10,113,559 | B2 | 10/2018 | Turner et al. | |
| 10,655,538 | B2 | 5/2020 | Gilson et al. | |
| 10,914,188 | B2 * | 2/2021 | Ekra Devalere et al. | F02C 6/08 |
| 11,028,722 | B2 * | 6/2021 | Freeman | F01D 11/24 |
| 11,047,258 | B2 * | 6/2021 | Whittle | F01D 17/085 |
| 11,203,949 | B2 * | 12/2021 | Brinson | F01D 13/003 |
| 11,242,766 | B2 * | 2/2022 | Boudsocq | G01F 1/68 |
| 2004/0081552 | A1 * | 4/2004 | Guemmer | F04D 29/542 415/112 |
| 2005/0135924 | A1 * | 6/2005 | Prasad | F01D 5/16 415/115 |
| 2008/0295518 | A1 * | 12/2008 | Reba | F02C 7/24 60/725 |
| 2013/0195610 | A1 * | 8/2013 | Rose | F02C 7/045 415/115 |
| 2017/0081020 | A1 | 3/2017 | Pujar et al. | |
| 2018/0320541 | A1 | 11/2018 | Zelesky et al. | |
| 2019/0136708 | A1 * | 5/2019 | Sebastian | F01D 11/24 |
| 2020/0103139 | A1 | 4/2020 | Schiller et al. | |
| 2020/0386107 | A1 | 12/2020 | Hoisington et al. | |

FOREIGN PATENT DOCUMENTS

| | | |
|---|---|---|
| GB | 1085227 A | 9/1967 |
| GB | 2361035 A | 10/2001 |
| GB | 2471845 A | 1/2011 |
| WO | WO2005100753 A1 | 10/2005 |

OTHER PUBLICATIONS

Extended European Search Report for EP Application No. 21213880.4, dated Apr. 22, 2022, 8 pages.

* cited by examiner

PASSIVE TRANSPIRATIONAL FLOW ACOUSTICALLY LINED GUIDE VANE

CROSS-REFERENCE TO RELATED APPLICATION(S)

This application claims the benefit of U.S. Provisional Application No. 63/065,923, filed Aug. 14, 2020 for "ACTIVE FLOW CONTROL TRANSPIRATIONAL FLOW ACOUSTICALLY LINED GUIDE VANE" by N.D. Sawyers-Abbott and D. Prasad.

BACKGROUND

The present disclosure is related generally to noise attenuation in geared turbofan engines and more specifically to noise reduction features provided on guide vanes.

Aft fan noise is the dominant source of noise in geared turbofan engines and acoustic liners provided in the nacelle and engine are the primary means for reducing aft fan noise. Acoustic liners provided in the engine itself are becoming more important as nacelles become shorter relative to fan diameter with the development of turbofans having increased engine bypass ratios. The addition of acoustic liners to fan exit guide vanes in the fan case can increase the acoustically-treated area in the engine. This can be particularly advantageous in systems that extract air from the bypass duct for cooling core components and for active clearance control systems, as outlet holes used to extract bypass air cause acoustically-treated area losses. Additional improvements are needed to increase acoustically-treated area and reduce acoustically-treated area losses caused by cooling systems to enable further reductions in nacelle length.

SUMMARY

A passive transpirational flow acoustic liner assembly for a gas turbine engine includes a guide vane assembly and a conduit configured to deliver airflow received from the guide vane. The guide vane assembly includes an airfoil having a transpirational flow acoustic liner. The acoustic liner includes a face sheet defining a portion of an outer surface of the airfoil and having a plurality of first apertures, a segmented member coupled to the face sheet and having a plurality of chambers in fluid communication with the outer surface via the plurality of first apertures, a backing sheet having a plurality of apertures and being coupled to the segmented member such that the segmented member is positioned between the face sheet and the backing sheet, and a plenum coupled to the backing sheet opposite the segmented member and fluidly connected to the conduit.

A method for providing acoustic attenuation in a fan section of a gas turbine engine drawing airflow through an acoustic liner on a guide vane, with the acoustic liner being open to an outer flow surface of the guide vane, and exhausting airflow from the guide vane to an area having a lower pressure than the outer flow surface.

A vane for use in a gas turbine engine includes an airfoil having a suction side and a pressure side and a transpirational flow acoustic liner disposed in the airfoil. The liner includes a face sheet defining a portion of an outer surface of the airfoil and having a plurality of first apertures, a segmented member coupled to the face sheet and including plurality of chambers in fluid communication with the outer surface via the plurality of first apertures, and a backing sheet having a plurality of second apertures coupled to the segmented member such that the segmented member is positioned between the face sheet and the backing sheet, and a plenum coupled to the backing sheet opposite the segmented member, the plenum in fluid communication with the outer surface via the plurality of second apertures, the plurality of chamber, and the plurality of first apertures.

The present summary is provided only by way of example, and not limitation. Other aspects of the present disclosure will be appreciated in view of the entirety of the present disclosure, including the entire text, claims and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A passive flow control transpirational flow acoustically lined guide vane can improve aft fan noise attenuation. In the disclosed transpirational flow acoustic liner, airflow can be drawn into the vane by a pressure differential. Suction created on the acoustic liner flow surface can reduce drag on the guide vane by retaining laminar flow across the rougher acoustic liner surface of the vane. Airflow drawn through the vane can be exhausted to an outer surface of a nacelle having a lower pressure than the fan bypass duct, or can be used for cooling core components and for active clearance control in the turbine.

Figure 1:
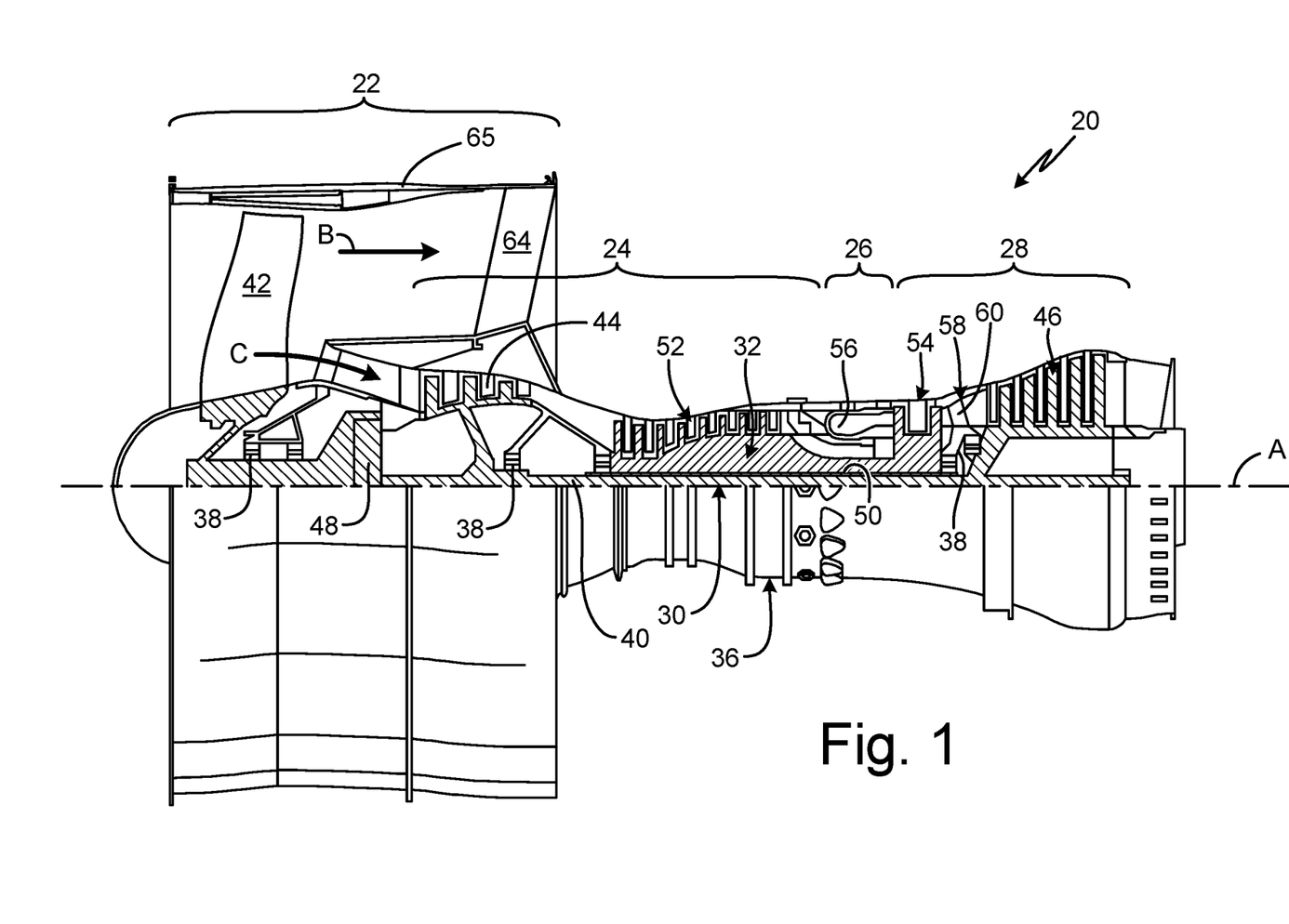
FIG. 1 is a quarter-sectional view of a gas turbine engine.

FIG. 1 is a quarter-sectional view of a gas turbine engine 20 that includes fan section 22, compressor section 24, combustor section 26 and turbine section 28. Fan section 22 includes fan 42, exit guide vane 64, and fan case 65. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a low-bypass turbine engine, or a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure compressor section 44 to low pressure turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure compressor section 52 and high pressure turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52, mixed with fuel, and ignited in combustor 56 to produce high speed exhaust gases that are then expanded through high pressure turbine 54 and low pressure turbine 46. Mid-turbine frame 57 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a fan exit guide vane 64 system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
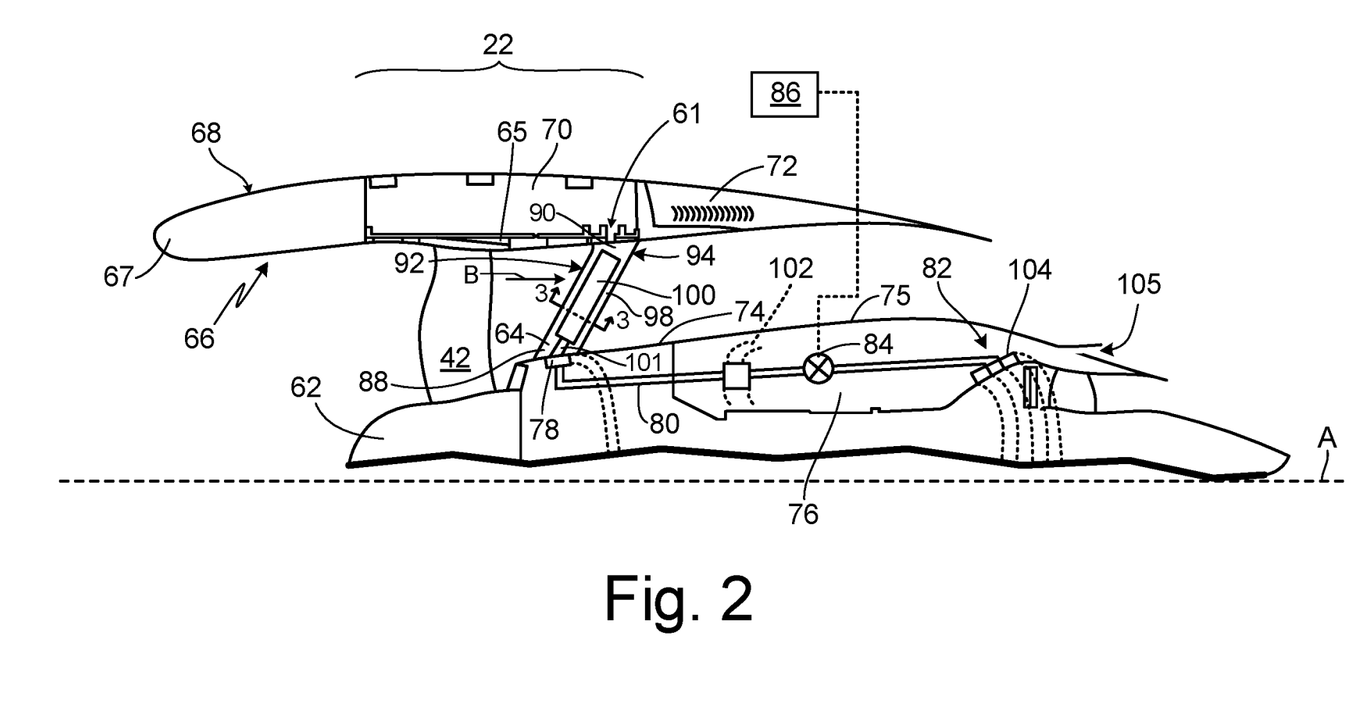
FIG. 2 is a simplified side sectional view of a passive transpirational acoustic liner assembly and active clearance control system in a gas turbine engine.

FIG. 2 illustrates passive transpirational flow acoustic liner assembly 61 in a fan section of the gas turbine engine of FIG. 1. FIG. 2 shows fan section 22 with fan blade 42, fan rotor 62, fan exit guide vane 64, and fan case 65; nacelle 66 having inlet cowl 67 with outer surface 68, fan cowl door 70, and thrust reverser 72; core housing 74, inner fixed structure (IFS) 75, cavity 76, guide vane manifold 78, conduit 80, and active clearance control (ACC) system 82 including valve 84; and controller 86. Nacelle 66, including inlet cowl 67, fan cowl door 70, thrust reverser 72, and IFC 75 forms a shroud around the engine. These elements are present but not shown in FIG. 1. Fan case 65 is spaced radially outwardly of fan blade 42. Fan cowl door 70 forms a portion of nacelle 66 positioned around fan case 65. Thrust reverser 72 forms a portion of nacelle 66 aft of fan cowl door 70. Exit guide vane 64 is positioned aft of fan blade 42 and is secured to fan case 65 at a radially outer end and core housing 74 at a radially inner end.

Exit guide vane 64 includes an airfoil having base 88 (radially innermost end), tip 90 (radially outermost end), leading edge 92, trailing edge 94, pressure side 96 (shown in FIG. 3), suction side 98, acoustic liner 100, and channel 101. Exit guide vane 64 extends between core housing 74 and fan case 65 with base 88 fixed to core housing 84 and tip 90 fixed to fan case 65. Exit guide vane 64 is one of multiple circumferentially spaced guide vanes. Exit guide vanes 64 remove the swirl imparted to the bypass flow by fan blades 42 and straighten or redirect flow in a substantially axial direction. As illustrated in FIG. 2, leading edge 92 can be swept rearwardly over a full radial extent of the bypass duct from base 88 to tip 90 to reduce noise. The arrangement and number of guide vanes 64 can be optimized to improve noise attenuation as taught in U.S. Pat. No. 1,010,719.

Acoustic liner 100 is a transpirational flow liner open to an outer surface of guide vane 64 and to channel 101 thereby fluidly connecting channel 101 with bypass flow B. Channel 101 is connected to acoustic liner 100 at base 88 of exit guide vane 64. Channel 101 is fluidly connected to conduit 80 in core housing 74 via guide vane manifold 78. Conduit 80 extends through cavity 76 with one or more outlets located in cavity 76 as described further below. As such, cavity 76 is fluidly connected to the fan bypass duct and bypass flow B via conduit 80, guide vane manifold 78, channel 101, and acoustic liner 100. Acoustic liner 100 can extend a substantially full length of guide vane 64 from base 88 to tip 90 to provide maximum acoustic benefit or can extend a maximum length that can be accommodated by guide vane 64 without compromising structural integrity.

A pressure differential between the fan bypass duct at an outer surface guide vane 64 and cavity 76 causes bypass flow B to be drawn into exit guide vane 64 through acoustic liner 100 and conduit 80 and into cavity 76. The biased flow through exit guide vane 64 creates suction on the outer flow surface of exit guide vane 64. The suction on the outer flow surface helps prevent separation of flow and retain a laminar flow over the acoustic liner surface, which has increased surface roughness in comparison to the remainder of the outer surface of exit guide vane 64. Biased flow through acoustic liner 100 thereby reduces drag on exit guide vane 64, which can lead to improved TSFC. Additional acoustic benefit can be gained with biased flow through acoustic liner 100 as flow through acoustic liner 100 can provide enhanced acoustic dissipation. Sound waves drawn into acoustic liner 100 with airflow exit with airflow from the fan duct thereby reducing a potential for noise to reenter the fan duct.

Guide vane manifold 78 can receive cooling air from the plurality of guide vanes 64 via channels 101. Guide vane manifold 78 can be an annular or partial ring (shown in phantom) connecting outlets of channels 101 from the plurality of guide vanes 64 having acoustic liners 100. Guide vane manifold 78 can be any shape and configuration capable of combining cooling air flow received from guide vanes 64. Conduit 80 connects to guide vane manifold 78.

Conduit 80 can connect guide vane manifold 78 to cavity 76 via one or more outlets or passages 102 and/or ACC system 82. Valve 84 can control flow through conduit 80.

Cooling air can be delivered from conduit 80 to core cavity 76 for cooling electrical and mechanical components, replacing the air in cavity 76, and feeding ACC system 82. Flammability regulations require that air in cavity 76 be replaced to remove flammable gases. Passive transpirational flow acoustic liner assembly 61 can be configured to replace core cavity air greater than one time every minute with air received from guide vanes 64. One or more tubes or passages 102 can connect to conduit 80 and direct cooling air to specified locations in core cavity 76. For example, cooling air can be directed to electrical power feeder cables (PFC) or an aircraft's environmental control system (ECS) valve housed in cavity 76 and also to an integrated drive generator (IDG), among other components that require cooling during various modes of operation. Use of passages 102 to cool components can reduce or eliminate the need for providing holes through inner fixed structure (IFS) 75, which are typically provided to cool components and replace the air in cavity 76. Holes through IFS 75 reduce the acoustically-treated area of the fan bypass duct. As such, acoustically-treated area can be increased by delivering cooling air received from guide vanes 64 to cavity 76. In addition, the penetrations through IFS 75 also represent additional loss mechanisms in the TSFC due to the shape of the penetrations through the IFS. One or more passages 102 (shown in phantom) can extend circumferentially around the engine core and can include a plurality of holes directed at components or can branch off from conduit 80 or a duct from conduit 80 at one or more locations and extend to identified hot regions or components requiring cooling. Cooling air can be circulated in cavity 76 and exhausted from cavity 76 to atmosphere through aft vent 105. A pressure differential between cavity 76 and the external atmosphere drives cooling air out through aft vent 105.

ACC system 82 can be used to control a clearance between turbine rotor blade tips and a shroud or blade outer air seals (BOAS, not shown) as known in the art. ACC system 82 includes conduit 80, valve 84, and one or more annular turbine cooling passages 104. Valve 82 is configured to control flow through conduit 80. Cooling air from guide vanes 64 can be delivered to cooling passages 104 via conduit 80. ACC system 82 can be configured as known in the art to deliver cooling air to one or more cooling passages 104 surrounding turbine rotor blades to cause contraction a thermal control ring (not shown) toward blade tips to reduce losses at blade tips and improve engine efficiency. Cooling passages 104 can be mounted to the high pressure turbine section 54 where operating temperatures are highest or can be mounted to both high pressure turbine section 54 and low pressure turbine section 46. Cooling passages 104 can direct cooling air received from guide vanes 64 through a plurality of holes in cooling passages 104 disposed circumferentially (shown in phantom) around the turbine section to a back side (radially outer surface) of a thermal control ring surrounding the rotor blades. The cooling air can cause thermal contraction of the thermal control ring inward toward rotor blade tips thereby reducing a clearance between the blade tips the thermal control ring or BOAS connected thereto as known in the art. Cooling passages 104 can be connected by a manifold and/or accumulator as known in the art to divide flow among different turbine stages. One or more valves (not shown) can be used to further regulate flow. For example, a valve or accumulator can be located between turbine stages. Cooling air feeding ACC system 84 and impinging on the thermal control ring is fluidly connected to cavity 76 and can be exhausted through aft vent 105.

Valve 84 can be any type of valve known in the art capable of providing on/off flow control or regulated flow control through conduit 80. Valve 84 can be controlled by controller 86 (e.g., engine FADEC system). Valve 84 is used to operate ACC system 82. An open/closed position of valve 84 can be scheduled based on power ratings or can be regulated based on need, for example, as determined by sensors as known in the art. Valve 84 can be closed, for example, during aircraft takeoff climb during which time ACC system 82 is generally not necessary. High operating temperatures during aircraft takeoff and climb cause thermal growth of turbine blades toward the shroud or BOAS thereby minimizing blade tip clearance and reducing efficiency losses associated with tip leakage. There is an increased need to cool components in cavity 76 during takeoff and climb. With valve 84 in a closed position, all cooling air extracted from the fan bypass duct through guide vane 64 can be directed to cavity 76 via one or more passages 102.

Valve 84 can be opened during cruise as power settings are reduced, operating temperatures drop, and blade tip clearance increases. During cruise, cooling air can be directed to ACC system 82 to cause thermal control ring to contract toward turbine blade tip thereby minimizing tip clearance and reducing efficiency losses associated with tip leakage. A portion of cooling air through conduit 80 can be directed to cavity 76 through one or more passages 102 to cool components and replace air in cavity 76. The need for cooling components is reduced during cruise as operating temperatures are lower than during takeoff and climbing operations. Conduit 80 and passages 102 and 104 can be sized and configured to provide sufficient cooling air flow to ACC system 82 when valve 84 is open. In some embodiments, cooling holes through IFS 75 can be used to provide additional cooling to components in cavity 76.

Typically, bypass air for ACC systems is provided through a large opening in core housing 74. Such opening reduces acoustically-treated area. The use of passive transpirational acoustic flow assembly 61 for ACC system 82 eliminates the need to provide an opening in core housing 74 thereby reducing acoustically-treated area losses. Additionally, in low fan pressure ratio systems, a hooded scoop on core housing 74 can be required to direct cooling air into the core housing opening for the ACC system. Such hooded scoop extends into the fan bypass duct where it can increase drag and thereby reduce engine efficiency. The need for a hooded scoop is also eliminated when passive transpirational acoustic flow assembly 61 is used to provide cooling air for ACC system 82.

Guide vane manifold 78, conduit 80, cavity passages 102, valve 84, and ACC system passages 104 can be formed from materials suitable for a temperature and environmental conditions in which they are located. Suitable materials can include but are not limited to composite materials, plastics, aluminum, steel, and titanium. Conduit 80 can be divided into sections formed of differing materials based on variations in operational temperatures between the location of guide vane 64 and turbine section 28.

Figure 3:
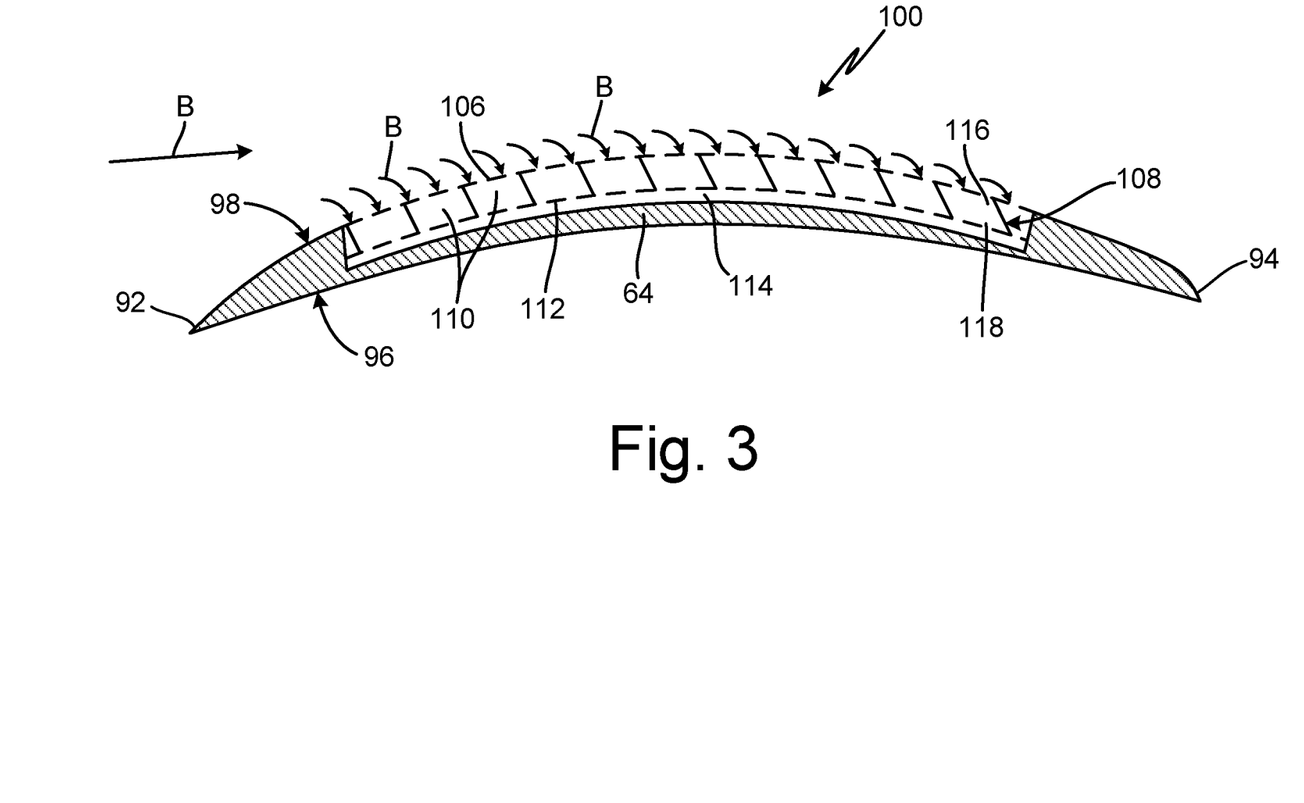
FIG. 3 is a cross-sectional view of a fan exit guide vane with a transpirational flow acoustic liner taken along the 3-3 line of FIG. 2.

FIG. 3 illustrates a cross-sectional view of fan exit guide vane 64 with acoustic liner 100 taken along the 3-3 line of FIG. 2. FIG. 3 shows leading edge 92, trailing edge 94, pressure side surface 98, suction side surface 96, and acoustic liner 100. Acoustic liner 100 includes perforated face sheet 106, segmented member 108 with chambers 110, perforated backing sheet 112, and plenum 114. Acoustic liner 100 can be a cartridge-type member that can be inserted into a pocket of guide vane 64 or can be integrally formed with guide vane 64. Acoustic liner 100 can be formed via an additive manufacturing process such as powder bed metallurgy, direct metal laser sintering, select laser sintering, select laser melting, electron beam melting or other. Acoustic liner 100 can be disposed on suction side 98 such that perforated face sheet 106 forms a portion of the suction side outer surface. Most flow separation and losses occur on the low pressure or suction side of the airfoil. As such, greater benefit may be achieved by improving flow efficiency on suction side 98. In alternative embodiments, acoustic liner 100 can be provided on both suction side 98 and pressure side 96 or pressure side 96, alone.

Perforated face sheet 106 can define a portion of the outer surface of guide vane 64. Segmented member 108 can be coupled to a back side of perforated face sheet 106. Perforated backing sheet 112 can be coupled to segmented member 108 such that segmented member 108 is positioned between perforated face sheet 106 and perforated backing sheet 112. Plenum 114 can be coupled to perforated backing sheet 112 opposite segmented member 108. As arranged, plenum 114 is in fluid communication with the outer surface of guide vane 64 via openings in perforated backing sheet 112, chambers 110 in segmented member 108, and openings in perforated face sheet 106, such that bypass flow B can enter exit guide vane 64 through perforated face sheet 106 and can flow through segmented member 108 and perforated backing sheet 112 to plenum 114. Plenum 114 is connected to or forms channel 101 open to base 88, which is fluidly connected guide vane manifold 78 and conduit 80. Plenum 114 can be closed at tip 90.

Perforated face sheet 106 includes a plurality of apertures 116 configured to allow bypass flow B into guide vane 64 and communicate acoustic energy to underlying chambers 110 of segmented member 108. Apertures 116 can be round holes having a diameter in the range of 3 to 50 thousandths of an inch and can cover at least 5% of the surface of face sheet 106. Apertures 116 can be configured to create suction along the outer surface of guide vane 64 to prevent boundary layer flow separation, promote laminar flow, and reduce skin friction losses across exit guide vane 64 in the bypass duct aft of fan 42. Apertures 116 can be arranged in rows or patterns with substantially uniform spacing between apertures 116. The number, size, and arrangement of apertures 116 can be designed to maximize acoustic attenuation performance while optimizing suction along the outer surface of exit guide vane 64 to enhance flow and minimize drag. Apertures 116 can be sized to limit clogging. In alternative embodiments, apertures 116 can have other shapes and configurations designed to optimize flow along the outer surface of exit guide vane 64 and/or optimize acoustic attenuation. Perforated face sheet 106 can be configured to provide a substantially smooth surface with suction side 98 of exit guide vane 64. Perforated face sheet 106 can be constructed of metal, composites, and/or other known materials.

Segmented member 108 is a cellular structure such as a honeycomb structure as known in the art with open chambers 110. Segmented member 108 is disposed on the back side of perforated face sheet 106 such that perforated face sheet 106 covers chambers 110 and apertures 116 are open to chambers 110. Segmented member 108 can be designed to provide structural support. The size of chambers 110 can be optimized for providing structural support and for receiving acoustic energy. Segmented member 108 can be constructed of metal, composites, and/or other known materials. In some embodiments, acoustic liner 100 can be a double degree of freedom (DDOF) liner (not shown) in which segmented member 108 includes two cellular structure layers separated by a perforated sheet allowing air flow between the cellular structures. DDOF liners can provide additional acoustic attenuation benefit over a single row of honeycomb resonators. The first and second cellular structure layers can be tuned to different tones to achieve improved acoustic attenuation.

Perforated backing sheet 112 is disposed on a back side of segmented member 108 such that segmented member 108 is sandwiched between perforated face sheet 106 and perforated backing sheet 112. Perforated backing sheet 112 provides structural support for segmented member 108 and allows bypass flow B to be drawn through acoustic liner 100. Perforated backing sheet 112 is arranged to cover chambers 110 on the back side of segmented member. Perforated backing sheet 112 includes a plurality of apertures 118 configured to allow bypass flow B into plenum 114. Apertures 118 are open to chambers 110 and communicate bypass flow B from chambers 110 in segmented member 108 to plenum 114. Apertures 118 can be round holes having a diameter in the range of 3 to 100 thousandths of an inch and can cover at least 5% of the surface of perforated backing sheet 112. Apertures 118 can be configured to provide optimal flow dynamics through acoustic liner 100. Apertures 118 can be arranged in rows or patterns with substantially uniform spacing between apertures 118. The number, size, and arrangement of apertures 118 can be designed to optimize fluid flow through acoustic liner 100. In alternative embodiments, apertures 118 can have other shapes and configurations designed to optimize fluid flow. Perforated backing sheet 112 can be constructed of metal, composites, and/or other known materials.

Plenum 114 is disposed on a back side of perforated backing sheet 112. Plenum 114 can be formed by an enclosure connected to perforated backing sheet 112 or can be a gap formed between perforated backing sheet 112 and an interior surface of guide vane 64 upon assembly. Plenum 114 can be closed at a radially outer end of acoustic liner 100 near tip 90 and can be open at a radially inner end of acoustic liner 100 near base 88 where plenum 114 forms or connects to channel 101 to allow bypass flow B to be drawn through acoustic liner 100 into guide vane manifold 78 and conduit 80. Plenum 114 can be sized to provide effective fluid flow through acoustic liner 100.

An acoustic liner 100 can be included in every fan exit guide vane 64 to maximize the size of the acoustically-treated area within the engine. In alternative embodiments, acoustic liners 100 can be incorporated in less than all of exit guide vanes 64. For example, an acoustic liner 100 can be provided in every other exit guide vane 64 such that approximately half of the exit guide vanes 64 have acoustic liners 100 and approximately half of exit guide vanes 64 do not have acoustic liners 100. The number and arrangement of exit guide vanes 64 with acoustic liners 100 can be designed to optimize noise attenuation.

In some embodiments, acoustic attenuation properties of acoustic liner 100 can be optimized as described in U.S. Pat. No. 7,540,354, "Micro-perforated Acoustic Liner," and U.S. Pat. No. 10,107,191, "Geared Gas Turbine Engine with Reduced Fan Noise," which are incorporated by reference.

During operation of transpirational flow acoustic liner assembly 61, bypass flow B is drawn into exit guide vane 64 aft of fan blades 42, thereby establishing suction on an outer surface of face sheet 106 of acoustic liner 100. Suction is created by drawing bypass flow B through acoustic liner 100 into plenum 114, guide vane manifold 78, conduit 80, and cavity 76. A pressure differential between the fan bypass duct (at guide vane 64) and core cavity 76 causes bypass flow B to be drawn into guide vane 64 and through conduit 80 to cavity 76 via passage 102 or ACC system 82. Controller 86 can be used to preferentially regulate flow through acoustic liner 100 during operation of the gas turbine engine by opening, closing, or modulating a position of valve 84 to regulate flow. For example, valve 84 can be closed at takeoff, causing cooling air to enter cavity 76 through one or more passages 102 to cool components. At cruise, valve 84 can be opened, causing cooling air to be directed to ACC system 82 to improve engine efficiency by reducing tip leakage. During ACC operation, a portion of the cooling air can continue to be delivered to cavity 76 via one or more passages 102 to cool components.

Figure 4:
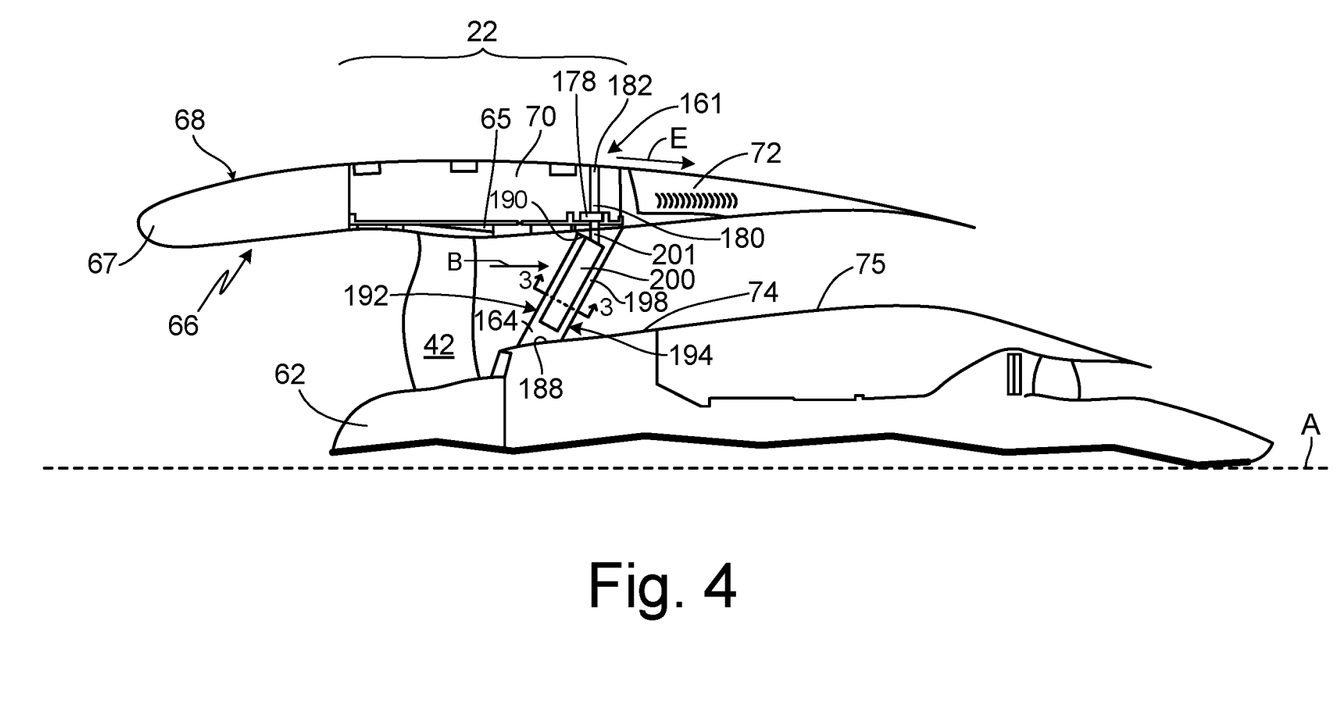
FIG. 4 is a simplified side sectional view of an alternative passive transpirational acoustic liner assembly in a gas turbine engine.

FIG. 4 illustrates passive transpirational flow acoustic liner assembly 161 in a fan section of a gas turbine engine. FIG. 4 shows portions of the gas turbine engine as described with respect to FIG. 2, including fan section 22, fan blade 42, fan rotor 62, fan case 65, nacelle 66, inlet cowl 67, outer surface 68, fan cowl door 70, thrust reverser 72, core housing 74, and IFC 75. Acoustic liner assembly 161 includes fan exit guide vane 164, guide vane manifold 178, conduit 180, and exhaust outlet 182. Conduit 180 is provided in nacelle 66. Conduit 180 can extend through fan case 65 into the cavity between fan case 65 and the nacelle outer surface. Conduit 180 can connect to exit guide vane 164 at one end via manifold 178 and exhaust outlet 182 at an opposite end. Exhaust outlet 182 can be located on outer surface 68 of nacelle 66 and, specifically, at an area of lower pressure than fan duct pressure B. Exit guide vane 164 is positioned aft of fan blade 42 and is secured to fan case 65.

Exit guide vane 164 includes an airfoil having base 188 (radially innermost end), tip 190 (radially outermost end), leading edge 192, trailing edge 194, pressure side 196 (not shown), suction side 198, acoustic liner 200, and channel 201. Exit guide vane 164 extends between core housing 84 and fan case 65 with base 188 fixed to core housing 84 and tip 190 fixed to fan case 65. Exit guide vane 164 is one of multiple circumferentially spaced guide vanes. Exit guide vanes 164 remove the swirl imparted to the bypass flow by fan blades 42 and straighten or redirect flow in a substantially axial direction. As described with respect to FIG. 2 and illustrated in FIG. 4, leading edge 192 can be swept rearwardly over a full radial extent of the bypass duct from base 188 to tip 190 to reduce noise and the arrangement and number of guide vanes 164 can be optimized to improve noise attenuation.

Acoustic liner 200 is a transpirational flow acoustic liner and can be substantially the same as acoustic liner 100 of FIG. 3 with the exception that channel 201 extends from plenum 114 tip 190 as opposed to base 188. Acoustic liner 200 (plenum 114) can be closed at base 188. Acoustic liner 200 is open to an outer surface of guide vane 64 and to channel 201 thereby fluidly connecting channel 201 with bypass flow B. Channel 201 is connected to acoustic liner 200 at tip 190 of exit guide vane 64. Channel 201 is fluidly connected to conduit 180 of fan case 65 via guide vane manifold 178, such that conduit 180 is fluidly connected to the bypass duct and bypass flow B. Acoustic liner 200 can extend a substantially full length of guide vane 164 from base 188 to tip 190 to provide maximum acoustic benefit, or can extend a maximum length that can be accommodated by guide vane 164 without compromising structural integrity.

A pressure differential between the bypass duct at an outer surface of guide vane 164 and outlet 182 causes bypass flow B to be drawn into exit guide vane 164 through acoustic liner 200 and can exhaust through conduit 180 and outlet 182 to outer surface 68 of nacelle 66. The biased flow through exit guide vane 164 creates suction on the outer flow surface of exit guide vane 164. The suction on the outer flow surface helps prevent separation of flow and retain a laminar flow over the acoustic liner surface, which has increased surface roughness in comparison to the remainder of the outer surface of exit guide vane 164. Biased flow through acoustic liner 200 thereby reduces drag on exit guide vane 164, which can lead to improved TSFC. Additional acoustic benefit can be gained with biased flow through acoustic liner 200 as flow through acoustic liner 200 can provide enhanced acoustic dissipation.

Guide vane manifold 178 can receive cooling air from the plurality of guide vanes 164 via channels 201. Guide vane manifold 178 can be an annular or partial ring connecting outlets of channels 201 from the plurality of guide vanes 164 having acoustic liners 200. Guide vane manifold 178 can be any shape and configuration capable of combining cooling air flow received from guide vanes 164. Conduit 180 connects to guide vane manifold 178.

Air flow through acoustic liner 200 can be channeled through passage 180 and exhausted through outlet 182 on outer surface 68 of nacelle 66 forward of thrust reverser 72 to promote a laminar flow or reduce skin friction losses along outer surface 68. Exhaust outlet 182 can be positioned at any area of lower pressure than fan duct pressure B.- In some embodiments, exhaust outlet 182 can include a plurality of openings disposed about the circumference nacelle 66. In some embodiments, exhaust of air flow can be limited to outer surface 68 on an upper or top side of nacelle 66 where increased flow efficiency can provide increased benefit. Depending on the amount of air flow drawn through acoustic liner 200 and exiting outlet 182, drag reduction of exhaust flow E may be achieved on outer surface 68. Drag reduction across outer surface 68 can reduce drag and thereby further improve fuel burn.

During operation of transpirational flow acoustic liner assembly 161, bypass flow B is drawn into exit guide vane 164 aft of fan blades 42, thereby establishing suction on an outer surface of face sheet 106 of acoustic liner 200. Suction is created by drawing bypass flow B through acoustic liner 200 into plenum 114 and conduit 180. A pressure differential between the bypass duct (at guide vane 164) and atmosphere (exhaust outlet 182) causes bypass flow B to be drawn into guide vane 164 and through conduit 180 and out through exhaust outlet 182.

The disclosed passive transpirational flow acoustic liner assemblies 61 and 161 can increase the acoustically-treated area of the fan bypass duct and reduce drag on exit guide vanes 64 and 164, respectively, by promoting drag reduction thereby improving fuel burn. Passive transpirational flow acoustic liner assembly 161 can further promote drag redution on nacelle outer surface 68. Improved noise attenuation resulting from an increase in acoustically-treated area can allow for reductions in fan duct length, which can enable installation of larger bypass ratio engine systems. Passive transpirational flow acoustic liner assembly 61 can further increase the acoustically-treated area by eliminating or reducing the need for cooling holes through IFS 75 needed to cool components and operate an ACC system, and can reduce drag by eliminating the need for a hooded scoop or other flow guide structure for operation of an ACC system or cooling holes. Passive transpirational flow acoustic liner assembly 61 can be used to cool components located in core compartment 76 and for ACC in turbine section 28.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A passive transpirational flow acoustic liner assembly for a gas turbine engine includes a guide vane assembly and a conduit configured to deliver airflow received from the guide vane. The guide vane assembly includes an airfoil having a transpirational flow acoustic liner. The acoustic liner includes a face sheet defining a portion of an outer surface of the airfoil and having a plurality of first apertures, a segmented member coupled to the face sheet and having a plurality of chambers in fluid communication with the outer surface via the plurality of first apertures, a backing sheet having a plurality of apertures and being coupled to the segmented member such that the segmented member is positioned between the face sheet and the backing sheet, and a plenum coupled to the backing sheet opposite the segmented member and fluidly connected to the conduit.

The assembly of the preceding paragraph can optionally include, additionally and/or alternatively, any one or more of the following features, configurations and/or additional components:

The assembly of the preceding paragraphs, wherein the conduit is disposed in a core housing of the gas turbine engine and fluidly connected to the plenum by an opening at a base of the airfoil.

The assembly of any of the preceding paragraphs, wherein the conduit includes an exhaust passage located to deliver airflow to components disposed in the core housing.

The assembly of any of the preceding paragraphs, wherein the conduit is connected to an active clearance control system in a turbine section of the gas turbine engine and configured to deliver airflow to the active clearance control system.

The assembly of any of the preceding paragraphs, wherein the active clearance control system comprises a valve located in a fluid position aft of the exhaust passage and configured to regulate the airflow to the turbine section.

The assembly of any of the preceding paragraphs, wherein the conduit is disposed in a nacelle of the gas turbine engine and fluidly connected to the plenum by an opening at a tip of the airfoil.

The assembly of any of the preceding paragraphs which further includes an exhaust outlet open to a radially outer surface of the nacelle and fluidly connected to the conduit.

A method for providing acoustic attenuation in a fan section of a gas turbine engine drawing airflow through an acoustic liner on a guide vane, with the acoustic liner being open to an outer flow surface of the guide vane, and exhausting airflow from the guide vane to an area having a lower pressure than the outer flow surface.

The method of the preceding paragraph can optionally include, additionally and/or alternatively, any one or more of the following features, configurations, additional components, and/or steps:

The method of the preceding paragraphs, wherein airflow is drawn through the acoustic liner and into a plenum of the guide vane.

The method of any of the preceding paragraphs which further includes drawing the airflow from a base of the guide vane into a conduit disposed in a core housing of the gas turbine engine.

The method of any of the preceding paragraphs can further include exhausting the airflow from the conduit to a cavity of the core housing to cool components located in the cavity.

The method of any of the preceding paragraphs which further includes delivering the airflow to an active clearance control system in a turbine section of the gas turbine engine.

The method of any of the preceding paragraphs which further includes further opening and closing a valve in the conduit to regulate cooling airflow to the turbine section for active clearance control, wherein opening the valve allows airflow to the turbine section and closing the valve inhibits airflow to the turbine section.

The method of any of the preceding paragraphs, wherein the valve is closed during a takeoff operation of the gas turbine engine and open during a cruise operation of the gas turbine engine A vane for use in a gas turbine engine includes an airfoil having a suction side and a pressure side and a transpirational flow acoustic liner disposed in the airfoil. The liner includes a face sheet defining a portion of an outer surface of the airfoil and having a plurality of first apertures, a segmented member coupled to the face sheet and including plurality of chambers in fluid communication with the outer surface via the plurality of first apertures, and a backing sheet having a plurality of second apertures coupled to the segmented member such that the segmented member is positioned between the face sheet and the backing sheet, and a plenum coupled to the backing sheet opposite the segmented member, the plenum in fluid communication with the outer surface via the plurality of second apertures, the plurality of chamber, and the plurality of first apertures.

The vane of the preceding paragraph can optionally include, additionally and/or alternatively, any one or more of the following features, configurations and/or additional components:

The vane of the preceding paragraphs, wherein the vane has a tip and a base disposed opposite the tip and wherein the plenum is open at one of the tip and the base and closed at the other of the tip and the base.

The vane of any of the preceding paragraphs, wherein first apertures of the plurality of first apertures have a diameter in a range of 3 to 50 thousandths of an inch.

The vane of any of the preceding paragraphs

The assembly of any of the preceding paragraphs, wherein the second apertures of the plurality of second apertures have a diameter in the range of 3 to 100 thousandths of an inch The vane of any of the preceding paragraphs, wherein the plenum is open at the base.

The vane of any of the preceding paragraphs, wherein the liner face sheet is located on the suction side of the airfoil.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A passive transpirational flow acoustic liner assembly for a gas turbine engine, the assembly comprising:
   a guide vane assembly comprising:
      an airfoil having a suction side and a pressure side; and
      a transpirational flow acoustic liner disposed in the airfoil, the liner comprising:
         a face sheet defining a portion of an outer surface of the airfoil and having a plurality of first apertures;
         a segmented member coupled to the face sheet, the segmented member comprising a plurality of chambers in fluid communication with the outer surface via the plurality of first apertures;
         a backing sheet coupled to the segmented member such that the segmented member is positioned between the face sheet and the backing sheet, the backing sheet having a plurality of second apertures; and
         a plenum coupled to the backing sheet opposite the segmented member; and
   a conduit fluidly connected to the plenum and configured to deliver airflow received from the plenum to one of:
      a plurality of exhaust outlets open to a radially outer surface of a nacelle of the gas turbine engine and disposed about a partial circumference of the nacelle; and
      a plurality of exhaust passages fluidly connected to the conduit and disposed in a core housing of the gas turbine engine,
   wherein the passive transpirational flow acoustic liner assembly is configured to deliver the airflow without use of a pump.

2. The assembly of claim 1, wherein the conduit is disposed in the core housing of the gas turbine engine and fluidly connected to the plenum by an opening at a base of the airfoil.

3. The assembly of claim 2, wherein the plurality of exhaust passages extend from the conduit and are located to deliver the airflow to components disposed in the core housing.

4. The assembly of claim 3, wherein the conduit is connected to an active clearance control system in a turbine section of the gas turbine engine and configured to deliver the airflow to the active clearance control system.

5. The assembly of claim 4, wherein the active clearance control system comprises a valve located in a fluid position aft of the plurality of exhaust passages and configured to regulate the airflow to the turbine section, wherein the airflow is delivered to the active clearance control system when the valve is open and the airflow is delivered to components disposed in the core housing via the plurality of exhaust passages when the valve is closed.

6. The assembly of claim 1, wherein the conduit is disposed in the nacelle of the gas turbine engine and fluidly connected to the plenum by an opening at a tip of the airfoil.

7. The assembly of claim 6, wherein the location of plurality of exhaust outlets is limited to an upper side of the nacelle.

8. A method for providing acoustic attenuation in a fan section of a gas turbine engine, the method comprising:
   drawing airflow through an acoustic liner on a guide vane and into a plenum of the guide vane, the acoustic liner open to an outer flow surface of the guide vane;
   drawing the airflow into a conduit fluidly connected to a plenum of the acoustic liner; and
   exhausting the airflow from the guide vane to an area having a lower pressure than the outer flow surface, wherein exhausting the airflow comprises exhausting the airflow through one of:
      a plurality of exhaust outlets open to a radially outer surface of a nacelle of the gas turbine engine and disposed about a partial circumference of the nacelle; and
      a plurality of exhaust passages fluidly connected to a conduit and disposed in a core housing of the gas turbine engine;
   wherein the airflow is drawn through the acoustic liner and exhausted without use of a pump.

9. The method of claim 8, and further comprising drawing the airflow from a base of the guide vane into the conduit disposed in a core housing of the gas turbine engine.

10. The method of claim 9, and further comprising:
drawing the airflow into the plurality of exhaust passages, wherein the plurality of exhaust passages extend from the conduit; and
exhausting the airflow from the plurality of exhaust passages to a cavity of the core housing to cool components located in the cavity.

11. The method of claim 9, and further comprising delivering the airflow to an active clearance control system in a turbine section of the gas turbine engine.

12. The method of claim 11, and further comprising opening and closing a valve in the conduit to regulate cooling airflow to the turbine section for active clearance control, wherein opening the valve allows the airflow to the turbine section and closing the valve inhibits the airflow to the turbine section and exhausts the airflow from a plurality of passages extending from the conduit to a cavity of the core housing to cool components located in the cavity.

13. The method of claim 12, wherein the valve is closed during a takeoff operation of the gas turbine engine and open during a cruise operation of the gas turbine engine.

14. A passive transpirational flow acoustic liner assembly for use in a gas turbine engine, the passive transpirational flow acoustic liner assembly comprising:
a plurality of guides vane disposed in a fan section of the gas turbine engine, each guide vane comprising:
an airfoil having a suction side and a pressure side; and
a transpirational flow acoustic liner disposed in the airfoil, the liner comprising:
a face sheet defining a portion of an outer surface of the airfoil and having a plurality of first apertures;
a segmented member coupled to the face sheet, the segmented member comprising a plurality of chambers in fluid communication with the outer surface via the plurality of first apertures;
a backing sheet coupled to the segmented member such that the segmented member is positioned between the face sheet and the backing sheet, the backing sheet having a plurality of second apertures; and
a plenum coupled to the backing sheet opposite the segmented member, the plenum in fluid communication with the outer surface via the plurality of second apertures, the plurality of chamber, and the plurality of first apertures, wherein the plenum is open at a base of the airfoil and closed at a tip of the airfoil;
a manifold fluidly connected to the plenum of each guide vane by an opening at the base of the airfoil; and
a conduit disposed in a core housing of the gas turbine engine and fluidly connected to the manifold, wherein the conduit comprises a plurality of exhaust passages extending from the conduit to a cavity in the core housing, the plurality of exhaust passages located to deliver the airflow to components disposed in the cavity.

15. The assembly of claim 14, wherein the first apertures of the plurality of first apertures have a diameter in a range of 3 to 50 thousandths of an inch.

16. The assembly of claim 14, wherein the second apertures of the plurality of second apertures have a diameter in the range of 3 to 100 thousandths of an inch.

17. The assembly of claim 14, wherein the face sheet is located on the suction side of the airfoil.

18. The assembly of claim 14, and further comprising:
an active clearance control system in a turbine section of the gas turbine engine and fluidly connected to the conduit; and
a valve disposed in the conduit in a fluid position aft of the plurality of exhaust passages and configured to regulate the airflow to the turbine section, wherein the airflow is delivered to the active clearance control system when the valve is open and the airflow is delivered to components disposed in the cavity of the core housing when the valve is closed.

19. The assembly of claim 1, and further comprising:
a plurality of guide vane assemblies; and
a manifold fluidly connected to plenum of each guide vane assembly, wherein the conduit is fluidly connected to the manifold.

20. The assembly of claim 3, wherein the exhaust passages comprise a plurality of apertures directed toward the components disposed in the core housing.

* * * * *